(12) United States Patent
Chang et al.

(10) Patent No.: US 11,858,666 B2
(45) Date of Patent: Jan. 2, 2024

(54) PROPULSION METHOD BASED ON LIQUID CARBON DIOXIDE PHASE CHANGE AND PROPULSION DEVICE THEREOF

(71) Applicant: XI'AN JIAOTONG UNIVERSITY, Shaanxi (CN)

(72) Inventors: Zhengshi Chang, Shaanxi (CN); Cong Wang, Shaanxi (CN); Guanjun Zhang, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 29 days.

(21) Appl. No.: 17/514,887

(22) Filed: Oct. 29, 2021

(65) Prior Publication Data
US 2022/0056896 A1   Feb. 24, 2022

Related U.S. Application Data

(63) Continuation of application No. PCT/CN2020/070212, filed on Jan. 3, 2020.

(30) Foreign Application Priority Data

Dec. 25, 2019 (CN) .......................... 201911362131.3

(51) Int. Cl.
*F03H 1/00* (2006.01)
*B64G 1/26* (2006.01)
(Continued)

(52) U.S. Cl.
CPC ............... *B64G 1/26* (2013.01); *B64G 1/401* (2013.01); *B64G 1/402* (2013.01); *B64G 1/409* (2013.01); *F02K 9/425* (2013.01); *F03H 1/0093* (2013.01)

(58) Field of Classification Search
CPC .......... B64G 1/409; B64G 1/26; B64G 1/401; B64G 1/402; B64G 1/405; F02K 9/42; F02K 9/605; F02K 9/425; F02K 9/62
See application file for complete search history.

(56) References Cited

U.S. PATENT DOCUMENTS 5,533,331 A * 7/1996 Campbell ............... F02K 9/425
                                                       60/260
6,047,541 A   4/2000 Hampsten
(Continued)

FOREIGN PATENT DOCUMENTS

CN    202063261 U    12/2011
CN    102735114 A    10/2012
(Continued)

OTHER PUBLICATIONS

International Search Report of PCT/CN2020/070212.
Written Opinion of PCT/CN2020/070212.

*Primary Examiner* — Kyle Robert Thomas
(74) *Attorney, Agent, or Firm* — Dragon Sun Law Firm, PC; Nathaniel Perkins (57) ABSTRACT

The present disclosure discloses a propulsion method based on liquid carbon dioxide phase change and a propulsion device. The method includes the following steps of: accommodating carbon dioxide in a thermally insulated container in a liquid phase form; transiently heating to convert the carbon dioxide from a liquid phase to a gas phase; and jetting carbon dioxide gas after the phase change in a predetermined direction by a predetermined jet-out amount so as to obtain a propulsion force.

5 Claims, 3 Drawing Sheets

(51) Int. Cl.
    *B64G 1/40*     (2006.01)
    *F02K 9/42*     (2006.01)

(56) References Cited

U.S. PATENT DOCUMENTS

| | | | | |
|---|---|---|---|---|
| 6,513,602 B1 * | 2/2003 | Lewis | ................ | A62C 5/006 169/84 |
| 9,617,069 B2 * | 4/2017 | Fesmire | ............ | F16L 59/184 |

FOREIGN PATENT DOCUMENTS

| | | | |
|---|---|---|---|
| CN | 107487459 A | 12/2017 | |
| CN | 206980098 U | 2/2018 | |
| CN | 109238062 A | 1/2019 | |
| CN | 109654948 A | 4/2019 | |
| CN | 208975018 U | 6/2019 | |
| CN | 110053789 A | 7/2019 | |
| CN | 110207551 A | 9/2019 | |
| CN | 209639615 U | 11/2019 | |
| CN | 110979715 A | 4/2020 | |
| CN | 110979748 A | 4/2020 | |
| CN | 111003216 A | 4/2020 | |
| CN | 111003217 A | 4/2020 | |
| CN | 111003219 A | 4/2020 | |

\* cited by examiner

PROPULSION METHOD BASED ON LIQUID CARBON DIOXIDE PHASE CHANGE AND PROPULSION DEVICE THEREOF

CROSS-REFERENCE TO RELATED APPLICATION

This application is a bypass continuation application of PCT application no.: PCT/CN2020/070212. This application claims priorities from PCT Application No. PCT/CN2020/070212, filed Jan. 3, 2020, and from the Chinese patent application 201911362131.3 filed Dec. 25, 2019, the contents of which are incorporated herein in the entirety by reference.

TECHNICAL FIELD

The present disclosure belongs to the technical field of aerospace and extraterrestrial exploration propulsion, and particularly relates to a propulsion method based on liquid carbon dioxide phase change and a propulsion device thereof.

BACKGROUND

In recent years, with the rapid development of aerospace and extraterrestrial exploration technologies, people have growing demands on exploration, development and utilization of extraterrestrial resources. In the extraterrestrial exploration, the propulsion technology is a basic guarantee of transporting various types of aircrafts. Currently, existing mature technologies include a carrier rocket technology and an electric propulsion technology. Wherein, a propulsion force of a carrier rocket is mainly from energy conversions when a propellant is burnt, propulsion can be divided into liquid rocket propulsion and solid rocket propulsion according to types of the propellants, and while the two types of technologies obtain the large propulsion force, some defects, such as an ultrahigh temperature ablative material, environment hazards caused by toxic, harmful and even highly toxic discharges, reuse incapability, low fuel controllability (e.g., a solid propellant) and the like, are also thoroughly exposed. Due to the characteristics of small propulsion force, repeatable ignition, long endurance and the like, the electric propulsion technology is widely applied in the aspects of propulsion, deceleration and attitude adjustment of small-sized model products in near earth and deep space exploration, but shows powerlessness in the field of acquisition of the large propulsion force and high-efficiency propulsion application. Both the above-mentioned propulsion technologies belong to chemical propulsion, wherein the electric propulsion technology mainly generates acceleration and the propulsion force under the action of an electromagnetic field through plasma generated through working medium ionization.

The above-mentioned information disclosed in the background is merely used for reinforcing understanding on the background of the present disclosure, and thus may include information which does not constitute the prior art well-known to those of ordinary skill in the art in China.

SUMMARY

Aiming at the problems in the prior art, the present disclosure provides a propulsion method based on liquid carbon dioxide phase change and a propulsion device thereof. A propulsion force can be matched according to different application demands, high-temperature ablation and environment pollution are avoided, the objectives of high reliability and reusability are fulfilled, and the requirements for popularizing physical propulsion in different fields are met.

The objectives of the present disclosure are fulfilled by the following technical solution that a propulsion method based on liquid carbon dioxide phase change includes the following steps:

in a first step, accommodating carbon dioxide in a thermally insulated container in a liquid phase form;

in a second step, transiently heating to convert the carbon dioxide from a liquid phase to a gas phase; and in a third step, jetting carbon dioxide gas after the phase change in a predetermined direction by a predetermined jet-out amount so as to obtain a propulsion force.

In the method, in the first step, the carbon dioxide is accommodated in the thermally insulated container in the liquid phase form at a predetermined temperature, and the predetermined temperature is room temperature lower than a liquid-gas phase change temperature of carbon dioxide.

In the method, in the first step, the predetermined temperature is 10° C.

In the method, in the second step, time consumption of transient heating is in a millisecond grade.

In the method, in the second step, transient heating is implemented via heat transfer, heat exchange or energy conversions.

In the method, in the second step, a temperature rise of transient heating does not exceed 21° C.

In the method, in the third step, the carbon dioxide gas after the phase change is controlled to be jetted through release valves so as to obtain the propulsion force.

In the method, in the third step, the propulsion force is a continuous action force lasting for a predetermined time.

According to another aspect of the present disclosure, a propulsion device includes: a thermally insulated container, which accommodates carbon dioxide in a liquid phase form;

a transient heating module, which transiently heats the carbon dioxide in the liquid phase form in the thermally insulated container to convert the carbon dioxide from a liquid phase to a gas phase; and a jetting module, which controllably jets carbon dioxide gas after the phase change so as to obtain a propulsion force.

In the propulsion device, the thermally insulated container includes a thermally insulated tank capable of bearing a predetermined pressure, the jetting module includes a plurality of release values which are different in orientation and arranged on the thermally insulated tank, and in response to a predetermined propulsion force, the release valves are configured to regulate a jet-out amount of carbon dioxide gas.

Compared with the prior art, the present disclosure has the following advantages that:

1. In the aspect of the advanced nature, the present disclosure belongs to release of a huge propulsion force by a physical change, makes up for the defects of existing propulsion technologies, fills in gaps between existing liquid/solid fuel propulsion and electric propulsion, and is innovation upgradation on the prior art.

2. In the aspect of temperature, according to the present disclosure, the technical temperature rise is only about 21° C., which has almost no thermal effect on an engine and avoids ablation damage;

3. In the aspect of environmental protection, the present disclosure belongs to a purely physical process, no chemical reaction is performed, no any toxic and harmful substances are discharged, and the present disclosure is green and environmentally friendly;

4. In the aspect of economy, a propellant used in the present disclosure is only carbon dioxide, is very low in cost and easy to obtain, and meanwhile, a propulsor based on the technology can be reused, so that use cost can be greatly reduced; and 5. In the aspect of reliability, the phase change process can be implemented in the millisecond grade by methods such as heating and the like, temperature and propulsion force response time is short, the carbon dioxide after phase change is jetted out in a gas form as required so as to obtain different application propulsion forces, and the reliability degree is greatly improved.

BRIEF DESCRIPTION OF THE DRAWINGS

Various other advantages and benefits will become clear for those of ordinary skill in the art by reading the detailed description in the preferred specific embodiments below. The drawings of the Description are merely used for showing preferred embodiments, but should not be regarded as a limitation to the present disclosure. It is obvious that the described drawings below are only related to some embodiments of the present disclosure, and those of ordinary skill in the art also can obtain other drawings, without any inventive work, according to these drawings. In addition, in the whole drawings, the same reference signs represent the same components.

In the drawings.

The present disclosure will be further explained below in combination with the drawings and the embodiments.

DETAILED DESCRIPTION

The specific embodiments of the present disclosure will be described in more detail below with reference to FIG. 1 to FIG. 4. Although the specific embodiments of the present disclosure are shown in the drawings, it should be understood that the present disclosure can be implemented in various forms and should not be limited by the embodiments described herein. On the contrary, providing these embodiments is to understand the present disclosure more thoroughly and completely convey the scope of the present disclosure to those skilled in the art.

It should be illustrated that some words are used in the Description and claims for indicating specific components. Those skilled in the art should understand that those skilled may name the same component with different nouns. The Description and claims do not take differences of nouns as a mode of distinguishing components, but takes differences of the components in function as a distinguishing criterion. For example, "include" or "comprise" mentioned throughout in the Description and claims is an open term, and thus should be explained as "include, but not limited to". The Description subsequently describes the preferred embodiments for implementing the present disclosure, but the above-mentioned description aims at the general principle of the Description, but is not intended to limit the scope of the present disclosure. The protection scope of the present disclosure should be defined by the appended claims.

In order to facilitate understanding the embodiments of the present disclosure, further explanation and illustration will be carried out below in combination with the drawings by taking the specific embodiments as examples, and each drawing does not constitute limitation to the embodiments of the present disclosure.

Figure 1:
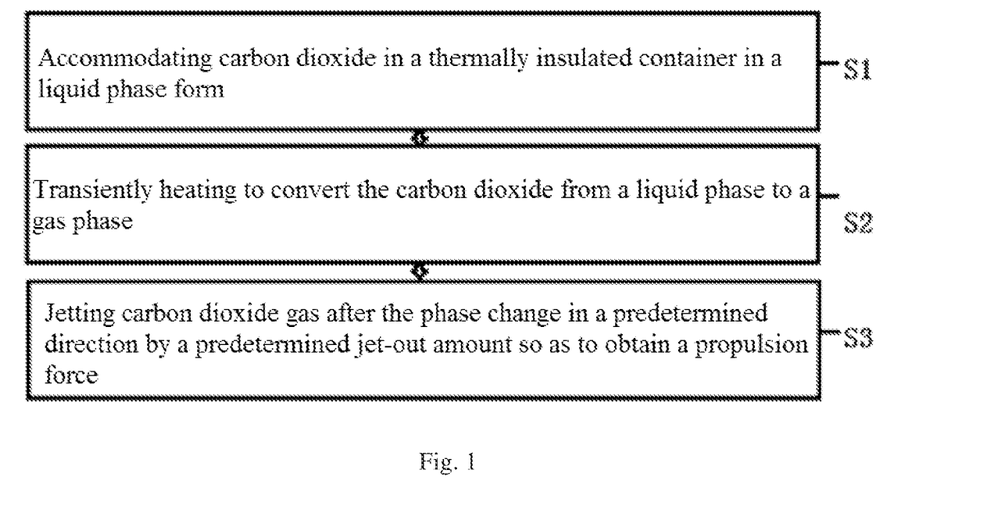
FIG. 1 is a step schematic diagram of a propulsion method based on liquid carbon dioxide phase change according to one embodiment of the present disclosure.

For better understanding, FIG. 1 is a step schematic diagram of a method according to one embodiment of the present disclosure, and as shown in FIG. 1, a propulsion method based on liquid carbon dioxide phase change includes the following steps that:

in a first step S1, carbon dioxide is accommodated in a thermally insulated container 1 in a liquid phase form;

in a second step S2, transient heating is carried out to convert the carbon dioxide from a liquid phase to a gas phase; and in a third step S3, a predetermined jet-out amount of carbon dioxide gas after the phase change is jetted in a predetermined direction so as to obtain a propulsion force.

According to the present disclosure, the liquid carbon dioxide just can be stored at a temperature of 10° C., a liquid-gas phase change temperature of the carbon dioxide is 31° C., and the phase change temperature is close to the room temperature; when the liquid-gas phase change occurs, the volume or the pressure is instantaneously increased by 500 to 600 times, the carbon dioxide is changed from liquid to gas, and this process purely is a physical process without generation of any toxic and harmful substances; and the gas after the phase change can generate a huge propulsion force by directional jetting-out, so that any propulsion demands, such as launching of a ground carrier rocket in the primary and secondary stages, continuous propulsion of an aircraft after rocket separation, efficient deceleration and relaunching of the aircraft during landing on the surface of the moon, the Mars, the Venus and even some minor planets, takeoff and landing propulsion of a remote surface exploration aircraft based on a mother ship on the surface of the Mars and the like, can be implemented.

In a preferred embodiment of the method, in the first step S1, the carbon dioxide is accommodated in the thermally insulated container 1 in the liquid phase form at a predetermined temperature, and the predetermined temperature is room temperature lower than a liquid-gas phase change temperature of carbon dioxide.

In a preferred embodiment of the method, in the first step S1, the predetermined temperature is 10° C.

In a preferred embodiment of the method, in the second step S2, time consumption of transient heating is in a millisecond grade.

In a preferred embodiment of the method, in the second step S2, transient heating is implemented via heat transfer, heat exchange or energy conversions.

In a preferred embodiment of the method, in the second step S2, a temperature rise of transient heating does not exceed 21° C.

In a preferred embodiment of the method, in the third step S3, the carbon dioxide gas after the phase change is controlled to be jetted through release valves 5 so as to obtain the propulsion force.

In a preferred embodiment of the method, in the third step S3, the propulsion force is a continuous action force lasting for a predetermined time.

In a preferred embodiment of the method, the thermally insulated container 1 is a high-pressure-resistant closed container.

In order to further understand the present disclosure, in one embodiment, the propulsion method based on the liquid carbon dioxide phase change includes: a liquid-gas phase change implementation technology and a propulsion control technology, wherein the liquid-gas phase change implementation technology mainly implements the change of the carbon dioxide from the liquid phase to the gas phase through transient heating, and transient heating technologies include, but are not limited to, electric heating, heat transfer, heat exchange and energy conversions; and the propulsion control technology is mainly that the carbon dioxide gas after the phase change is jetted out as required at a gas phase storage portion by a control technology of commanding the automatic release valves 5 through an adaptive program so as to obtain a target propulsion force.

Figure 2:
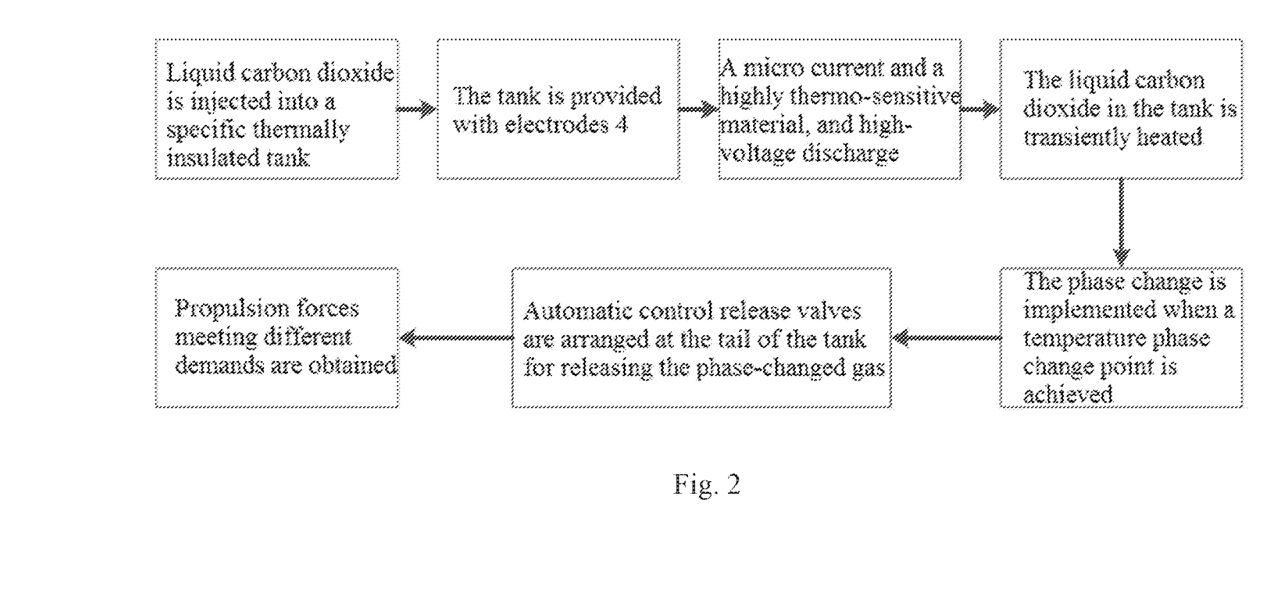
FIG. 2 is a flow schematic diagram of a propulsion method based on liquid carbon dioxide phase change according to one embodiment of the present disclosure.

As shown in FIG. 2, in one embodiment, the propulsion method based on the liquid carbon dioxide phase change includes:

the liquid carbon dioxide is injected into the thermally insulated container 1, e.g., a specific thermally insulated tank, the tank is provided with electrodes 4, the liquid carbon dioxide is heated by, for example, a micro current and a highly thermo-sensitive material, or the liquid carbon dioxide is heated by high-voltage discharge or in other heating manners and the like, the liquid carbon dioxide in the tank is transiently heated, the phase change is implemented when a temperature phase change point is achieved, and the automatic control release valves 5 are arranged at the tail of the tank for releasing the phase-changed gas so as to obtain propulsion forces meeting different demands.

A Propulsion Device Includes:

a thermally insulated container 1, which accommodates carbon dioxide in a liquid phase form;

a transient heating module 2, which transiently heats the carbon dioxide in the liquid phase form in the thermally insulated container 1 to convert the carbon dioxide from a liquid phase to a gas phase; and a jetting module 3, which controllably jets out carbon dioxide gas after the phase change so as to obtain a propulsion force.

In a preferred embodiment of the propulsion device, the thermally insulated container 1 includes a thermally insulated tank capable of bearing a predetermined pressure, the jetting module 3 includes a plurality of release values 5 which are different in orientation and arranged on the thermally insulated tank, and in response to a predetermined propulsion force, the release valves 5 are configured to regulate a jet-out amount of carbon dioxide gas.

Figure 3:
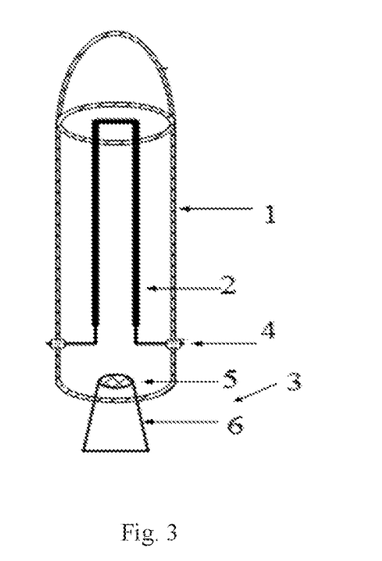
FIG. 3 is a structural schematic diagram of a propulsion device based on liquid carbon dioxide phase change according to one embodiment of the present disclosure.

In an embodiment as shown in FIG. 3, the inner diameter of the thermally insulated container 1 of a propulsor tank is adjustable within a range of 5 cm to 50 cm, and the height of the thermally insulated container 1, i.e., from a plane where the jetting module 3 including the release valves 5 at the tail is positioned to a position where the curvature radius of the head of a propulsor is the minimum, is adjustable within a range of 10 cm to 150 cm; and the thermally insulated container 1 adopts a thermal insulation material, e.g., thermal insulation carbon steel, alloy and the like, the temperature of the liquid carbon dioxide in the tank is kept always below a phase change temperature point, and when heating is triggered by utilizing micro current or high-voltage discharge plasma, the temperature can rapidly rise to the phase change point.

In an embodiment, the head of the thermally insulated container 1 is of an ellipsoid shape, the length of the short axis of the ellipsoid is adjustable within a range of 5 cm to 50 cm, and the length of the semi-major axis of the ellipsoid is adjustable within a range of 6 cm to 100 cm; and the wind resistance is reduced so as to benefit to formation of a stable flow field and heat loss in the propulsion process.

In one embodiment, the transient heating module 2 includes electrodes 4, each electrode 4 is a good conductor, the diameter of each electrode 4 is adjustable within a range of 0.1 mm to 2 mm, a material of each electrode 4 is not limited to copper and stainless steel, each electrode 4 is led into the propulsor tank via an insulator sleeve, a certain voltage is applied to both ends of each electrode 4, for example, the voltage magnitude is adjustable within a range of several volts to several hundred volts, and it is subject to a case that the micro current is generated so as to heat the liquid carbon dioxide. Each insulator sleeve is of an arc umbrella skirt structure, so that the creepage distance is increased, and insulation safety is ensured; and the electrodes 4 are arranged in the middle, so that insulation from the inner and outer walls of the propulsor tank is implemented.

In one embodiment, the highly thermo-sensitive material is of an inverted U shape, a spiral shape and the like; and the ends of two electrodes 4 inside the propulsor tank are connected with the highly thermo-sensitive material, when the micro current flows through the highly thermo-sensitive material, the highly thermo-sensitive material transiently emits heat, response time ranges from several hundred milliseconds to several milliseconds, and huge heat is released transiently for heating the liquid carbon dioxide so as to implement the phase change.

In one embodiment, the strength of the transient heating module 2 is higher than the pressure generated by the phase change.

In one embodiment, the transient heating module 2 is arranged at a distance of 1 cm to 4 cm to the wall of the thermally insulated container 1.

In one embodiment, the thermally insulated container 1 is provided with a protection structure for protecting the transient heating module 2, the strength of the protection structure is higher than the pressure generated by the phase change, and further, the pressure difference is 10 MPa to 500 MPa and is adjusted according to different demands. Further, the protection structure and the thermally insulated container 1 are integrally formed.

In one embodiment, the protection structure is an arc shielding structure.

In one embodiment, the jetting module 3 includes release valves 5 arranged at the tail of the thermally insulated container 1 and jet nozzles 6 connected with the release valves 5, and a pressure release threshold is adjustable within a range of 15 MPa to 100 MPa.

In one embodiment, automatic pressure release valves 5 are arranged at the tail of the propulsor, and automatically controls the pressure release threshold according to the sizes of the pressure and the required propulsion force in the phase changing process inside the propulsor tank.

In one embodiment, the inner diameter of each jet nozzle 6 is adjustable within a range of 1 cm to 15 cm, each jet nozzle 6 is of a jet nozzle 6 structure with a geometrical shape such as a conical shape, a bell shape, a plug-type shape, an expansion-bias current shape and the like, and each jet nozzle 6 which is adjustable in angle is arranged at the tail of the propulsor for guiding the gas-phase carbon dioxide released from the corresponding release valve 5 to generate the directional propulsion force.

Figure 4:
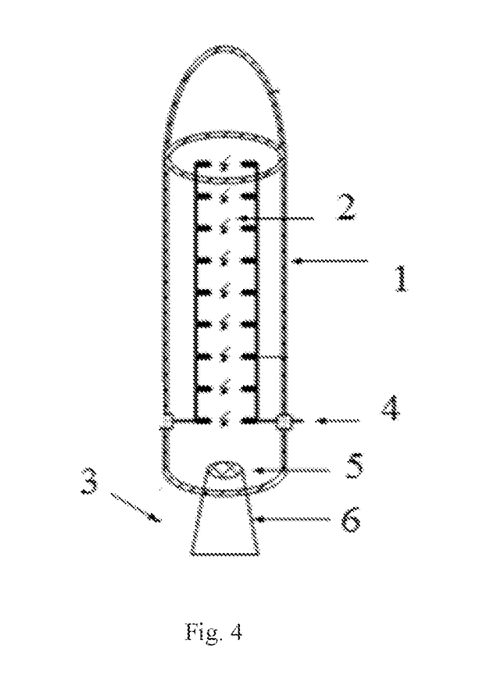
FIG. 4 is a structural schematic diagram of a propulsion device based on liquid carbon dioxide phase change according to one embodiment of the present disclosure.

In one embodiment as shown in FIG. 4, for example, the inner diameter of the thermally insulated container 1 of the propulsor tank is adjustable within a range of 5 cm to 50 cm, and the height of the thermally insulated container 1, i.e., from the plane where the jetting module 3 including the release valves 5 at the tail is positioned to the position where the curvature radius of the head of the propulsor is the minimum, is adjustable within a range of 10 cm to 150 cm; and the thermally insulated container 1 adopts a thermal insulation material, e.g., thermal insulation carbon steel, alloy and the like, the temperature of the liquid carbon dioxide in the tank is kept always below the phase change temperature point, and when heating is triggered by utilizing the micro current or high-voltage discharge plasma, the temperature can rapidly rise to the phase change point.

In one embodiment, the head of the thermally insulated container 1 is of an ellipsoid shape, i.e., the head of the propulsor is of an ellipsoid shape, the length of the short axis of the ellipsoid is adjustable within a range of 5 cm to 50 cm, and the length of the semi-major axis of the ellipsoid is adjustable within a range of 6 cm to 100 cm; and the wind resistance is reduced so as to benefit to formation of the stable flow field and heat loss in the propulsion process.

In one embodiment, the transient heating module 2 includes electrodes 4, each electrode 4 is a good conductor, the diameter of each electrode 4 is adjustable within a range of 0.1 mm to 2 mm, a material of each electrode 4 is not limited to copper and stainless steel, each electrode 4 is led into the propulsor tank via an insulator sleeve, a certain voltage is applied to both ends of each electrode 4, for example, the voltage magnitude is adjustable within a range of several hundred volts to several ten thousand volts, and it is subject to a case that the discharge plasma is generated in gaps of the highly thermo-sensitive electrodes 4 inside the tank. Each high-voltage insulator sleeve is designed to be of an arc umbrella skirt structure, so that the creepage distance is increased, and the insulation grade is improved; and the electrodes 4 are arranged in the middle, so that insulation from the inner and outer walls of the propulsor tank is implemented.

In one embodiment, the thermally insulated container 1 is provided with a protection structure for protecting the transient heating module 2, and the strength of the protection structure is higher than the pressure generated by the phase change. Further, the protection structure and the thermally insulated container 1 are integrally formed.

In one embodiment, the protection structure is of an arc shielding structure.

In one embodiment, in electrode 4 structures, each two highly thermo-sensitive electrodes 4 in the horizontal direction are set to form an electrode 4 structure which is designed into a pin-pin structure, a bar-bar structure and the like, and 1 to 20 pairs of electrode 4 structures can be arranged inside the tank according to the propulsion force demands, so that when a high voltage is applied to the electrodes 4, the discharge plasma can be generated in the gaps; and while discharge plasma channels are generated, a high current is formed, and then the material of the highly thermo-sensitive electrodes 4 is heated.

In one embodiment, the ends of two electrodes 4 inside the propulsor tank are connected with the highly thermo-sensitive material, when the discharge plasma is generated, the large current flows through the highly thermo-sensitive material, the highly thermo-sensitive material transiently emits heat, response time ranges from several microseconds to several milliseconds, and huge heat is released transiently for heating the liquid carbon dioxide so as to implement the phase change.

In one embodiment, the jetting module 3 includes release valves 5 arranged at the tail of the thermally insulated container 1 and jet nozzles 6 connected with the release valves 5. In one embodiment, automatic pressure release valves 5 are arranged at the tail of the propulsor, a pressure release threshold is adjustable within a range of 15 MPa to 100 MPa, and the pressure release threshold is automatically controlled according to the sizes of the pressure and the required propulsion force in the phase changing process inside the propulsor tank.

In one embodiment, the inner diameter of each jet nozzle 6 is adjustable within a range of 1 cm to 15 cm, each jet nozzle 6 is designed to be of a jet nozzle 6 structure with a geometrical shape such as a conical shape, a bell shape, a plug-type shape, an expansion-bias current shape and the like, and each jet nozzle 6 which is adjustable in angle is arranged at the tail of the propulsor for guiding the gas-phase carbon dioxide released from the corresponding release valve 5 to generate the directional propulsion force.

Although the embodiments of the present disclosure are described above in combination with the drawings, the present disclosure is not limited to the above-mentioned specific embodiments and application fields, and the above-mentioned specific embodiments are merely schematic and instructive, but are not limitative. Those of ordinary skill in the art can also make various forms under the enlightenment of the Description without departure from the scope protected by the claims of the present disclosure, and all the forms shall fall within the scope of protection of the present disclosure.

The invention claimed is:

1. A propulsion method based on liquid carbon dioxide phase change, comprising the following steps:
   in a first step (S1), accommodating carbon dioxide in a thermally insulated container of a propulsor (1) in a liquid phase form, wherein the carbon dioxide is injected into and accommodated in the thermally insulated container in the liquid phase form at a predetermined temperature, and the predetermined temperature is lower than a liquid-gas phase change temperature of carbon dioxide; the thermally insulated container (1) is a high-pressure-resistant closed container; and
   the thermally insulated container is provided with electrodes (4),
   and a jetting module (3) comprising release valves (5) arranged at a tail of the the thermally insulated container;
   an inner diameter of the thermally insulated container (1) is adjustable within a range of 5 cm to 50 cm, and the height of the thermally insulated container (1), from a plane where the jetting module (3) is positioned to a position where a curvature radius of a head of the propulsor is the minimum, is adjustable within a range of 10 cm to 150 cm;
   the head of the propulsor is of an ellipsoid shape, the length of the short axis of the ellipsoid is adjustable within a range of 5 cm to 50 cm, and the length of the semi-major axis of the ellipsoid is adjustable within a range of 6 cm to 100 cm; and wind resistance is reduced so as to benefit to formation of the stable flow field and heat loss in the propulsion process;

in a second step (S2), transiently heating by a transient heating module (2) comprising the electrodes using a micro current and a highly thermo-sensitive material, or a high-voltage discharge to convert the carbon dioxide from a liquid phase to a gas phase, wherein time consumption of transient heating is in a millisecond grade and a temperature rise of transient heating does not exceed 21° C., the transient heating module (2) is arranged at a distance of 1 cm to 4 cm to a wall of the thermally insulated container (1); and the thermally insulated container (1) is provided with a protection structure comprising an insulator sleeve for protecting the transient heating module (2), a strength of the protection structure is higher than a pressure difference generated by the phase change, and the pressure difference is 10 MPa to 500 MPa and is adjusted according to different demands, the protection structure and the thermally insulated container (1) are integrally formed; and the protection structure further comprising is an arc shielding structure; and in a third step (S3), jetting carbon dioxide gas after the phase change in a predetermined direction by a predetermined jet-out amount so as to obtain a propulsion force, wherein the release valves are commanded such that carbon dioxide gas after the phase change is controlled to be jetted through the release valves (5) so as to obtain the propulsion force, the jetting module (3) further includes jet nozzles (6) connected with the release valves (5), and a pressure release threshold of the release valves is adjustable within a range of 15 MPa to 100 MPa and the pressure release threshold is automatically controlled according the required propulsion force; and the inner diameter of each jet nozzle (6) is adjustable within a range of 1 cm to 15 cm, each jet nozzle (6) is designed with a geometrical shape including a conical shape, a bell shape, a plug-type shape, or an expansion-bias current shape, and each jet nozzle (6) is adjustable in angle at the tail of the propulsor for guiding the gas-phase carbon dioxide released from the corresponding release valve (5) to generate the directional propulsion force.

2. The method of claim 1, wherein in the third step (S3), the propulsion force is a continuous action force lasting for a predetermined time.

3. The propulsion method of claim 2, wherein the head of the propulsor is a half of the ellipsoid shape connected to a cylindric shape, transient heating module (2) comprises a micro current and a highly thermo-sensitive material; wherein the highly thermo-sensitive material is of an inverted U shape, and ends of two electrodes (4) inside the thermally insulated container are connected with a bottom of the highly thermo-sensitive material; wherein when the micro current flows through the highly thermo-sensitive material, the highly thermo-sensitive material transiently emits heat for heating the liquid carbon dioxide so as to implement the phase change; and wherein the jet nozzle has an expansion-bias current shape.

4. A propulsion device, comprising:

a thermally insulated container of a propulsor, which accommodates injected carbon dioxide in a liquid phase form, wherein the carbon dioxide is accommodated in the thermally insulated container in the liquid phase form at a predetermined temperature, and the predetermined temperature is a temperature lower than a liquid-gas phase change temperature of carbon dioxide; the thermally insulated container (1) is a high-pressure-resistant closed container; and the thermally insulated container 1, is provided with electrodes (4) and a Jetting module (3) comprising release valves (5) are arranged at a tail of the thermally insulated container;

an inner diameter of the thermally insulated container (1) is adjustable within a range of 5 cm to 50 cm, and the height of the thermally insulated container (1), from a plane where the jetting module (3) is positioned to a position where a curvature radius of a head of the propulsor is the minimum, is adjustable within a range of 10 cm to 150 cm;

the head of the propulsor is of an ellipsoid shape, the length of the short axis of the ellipsoid is adjustable within a range of 5 cm to 50 cm, and the length of the semi-major axis of the ellipsoid is adjustable within a range of 6 cm to 100 cm; and the wind resistance is reduced so as to benefit to formation of the stable flow field and heat loss in the propulsion process;

a transient heating module comprising the electrodes, the electrodes are configured to use a micro current and a highly thermo-sensitive material, or a high-voltage discharge, which transiently heats the carbon dioxide in the liquid phase form in the thermally insulated container to convert the carbon dioxide from a liquid phase to a gas phase, wherein time consumption of transient heating is in a millisecond grade and a temperature rise of transient heating does not exceed 21° C., the transient heating module (2) is arranged at a distance of 1 cm to 4 cm to a wall of the thermally insulated container (1); and the thermally insulated container (1) is provided with a protection structure comprising an insulator sleeve for protecting the transient heating module (2), a strength of the protection structure is higher than a pressure difference generated by the phase change, and the pressure difference is 10 MPa to 500 MPa and is adjusted according to different demands, the protection structure and the thermally insulated container (1) are integrally formed; and the protection structure further comprising an arc shielding structure; and the jetting module configured to command the release valves to controllably jet carbon dioxide gas through the release valves (5) after the phase change so as to obtain a propulsion force, the jetting module (3) further include jet nozzles (6) connected with the release valves (5), and a pressure release threshold of the release valves is adjustable within a range of 15 MPa to 100 MPa and the pressure release threshold is automatically controlled according the required propulsion force; and the inner diameter of each jet nozzle (6) is adjustable within a range of 1 cm to 15 cm, each jet nozzle (6) is designed with a geometrical shape including a conical shape, a bell shape, a plug-type shape, or an expansion-bias current shape, and each jet nozzle (6) is adjustable in angle at the tail of the propulsor for guiding the gas-phase carbon dioxide released from the corresponding release valve (5) to generate the directional propulsion force.

5. The propulsion method of claim 2, wherein the head of the propulsor is a half of the ellipsoid shape connected to a cylindric shape, transient heating module (2) comprises a micro current and a highly thermo-sensitive material; wherein the highly thermo-sensitive material is of an inverted U shape, and ends of two electrodes (4) inside the thermally insulated container are connected with a bottom of the highly thermo-sensitive material; wherein when the micro current flows through the highly thermo-sensitive material, the highly thermo-sensitive material transiently emits heat for heating the liquid carbon dioxide so as to implement the phase change; and wherein the jet nozzle has an expansion-bias current shape.

* * * * *